United States Patent [19]

Buswell et al.

[11] Patent Number: 5,340,663

[45] Date of Patent: Aug. 23, 1994

[54] FUEL CELL POWER PLANT

[75] Inventors: Richard F. Buswell, Glastonbury; George Vartanian, Ellington, both of Conn.

[73] Assignee: International Fuel Cells Corporation, South Windsor, Conn.

[21] Appl. No.: 912,578

[22] Filed: Jul. 13, 1992

Related U.S. Application Data

[63] Continuation of Ser. No. 290,019, Dec. 22, 1988, abandoned.

[51] Int. Cl.$^5$ .............................................. H01M 8/04
[52] U.S. Cl. ............................................ 429/17; 429/25
[58] Field of Search ............................. 429/17, 20, 25

[56] References Cited

U.S. PATENT DOCUMENTS

| 3,087,004 | 4/1963 | Thorsheim | 429/25 |
| 3,180,763 | 4/1965 | Miller et al. | 429/25 |
| 3,236,187 | 5/1973 | Harrison et al. | 429/25 |
| 4,537,839 | 8/1985 | Cameron | 429/20 |
| 4,904,547 | 2/1990 | Mizumoto et al. | 429/25 X |

FOREIGN PATENT DOCUMENTS

| 60-157163 | 1/1984 | Japan . |
| 60-212968 | 10/1985 | Japan . |
| 60-241665 | 11/1985 | Japan . |
| 63-34861 | 2/1988 | Japan . |
| 63-26171 | 5/1988 | Japan . |
| 2128013 | 4/1984 | United Kingdom . |

OTHER PUBLICATIONS

International Fuel Cells, "The PC 23 Fuel Cell A Strategic Alternative", 1985 (Product Description).

Primary Examiner—Stephen Kalafut

[57] ABSTRACT

A fuel cell power plant in which the fuel cell stack is enclosed within a containment vessel and in which reformer burner exhaust is used to pressurize and purge the containment vessel is disclosed. The fuel cell power plant provides dynamic pressure balancing between the purge gas and fuel cell reactants to prevent leakage of the reactants from the fuel cell yet avoid an excessive pressure differential between the fuel cell and the containment vessel.

4 Claims, 1 Drawing Sheet

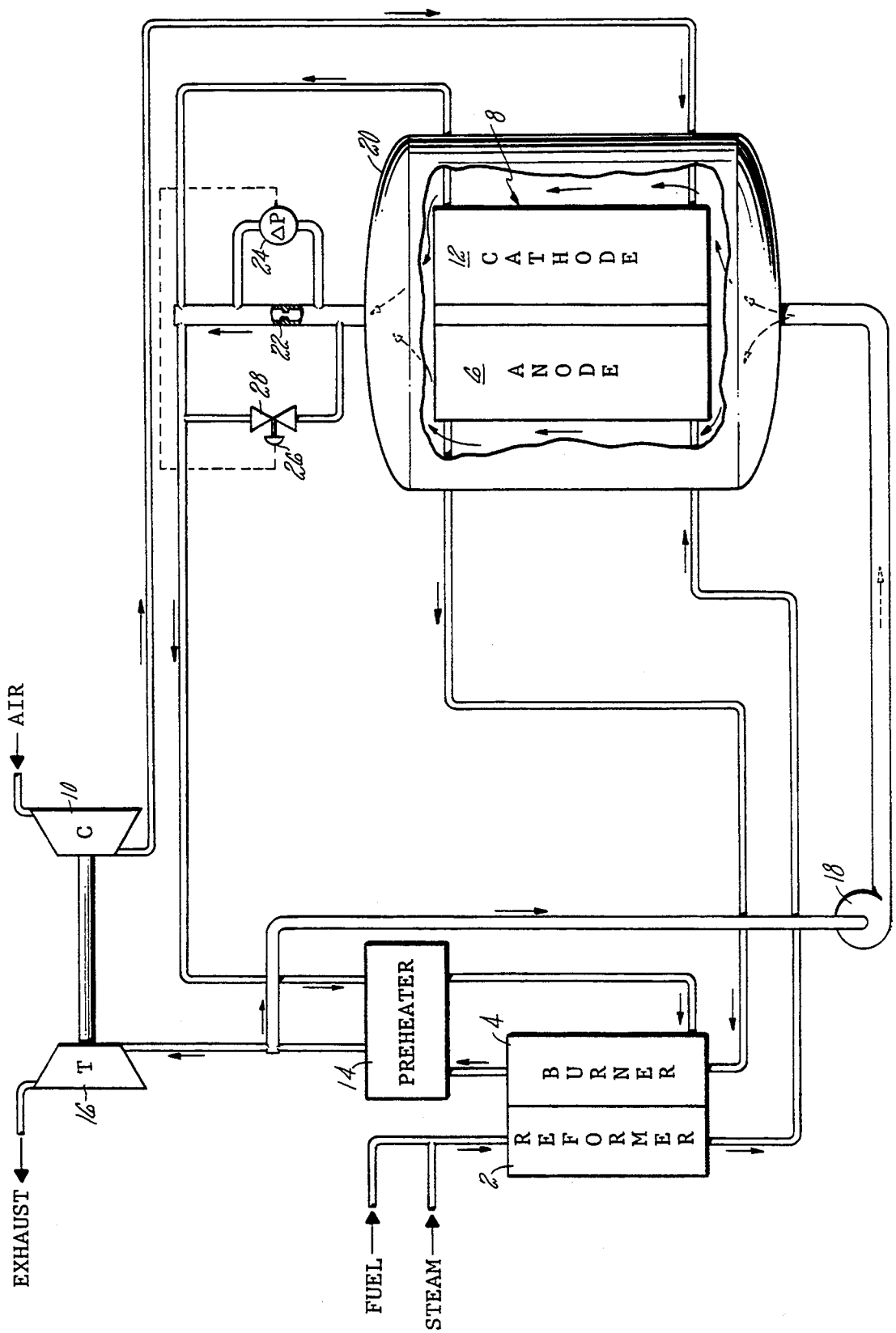

5,340,663

FUEL CELL POWER PLANT

This application is a continuation of U.S. Ser. No. 290,019, filed Dec. 22, 1988, now abandoned.

TECHNICAL FIELD

This invention relates to fuel cell power plants.

BACKGROUND ART

A fuel cell is a device for directly converting the chemical energy of a fuel into electrical energy.

A fuel cell comprises two gas diffusion electrodes, an anode and a cathode, and an electrolyte impregnated matrix. The matrix is disposed between the two electrodes. A catalyst layer is disposed on the electrolyte-facing surface of each electrode. In the operation of a typical fuel cell, a hydrogen-containing gas is fed to the back surface of the anode and oxygen-containing gas is fed to the back surface of the cathode. The gases diffuse through the electrodes and react at the catalyst sites to yield electrical energy, heat and moisture.

On the anode side of the cell, hydrogen is electrochemically oxidized to give up electrons. The electrical current so generated is conducted from the anode through an external circuit to the cathode. On the cathode side of the cell, the electrons are electrochemically combined with the oxidant. A flow of ions through the electrolyte completes the circuit.

Several types of fuel cells have been developed and may be broadly categorized according to the type of electrolyte used. Acid-type cells using concentrated phosphoric acid as the electrolyte are the most commercially advanced to the various fuel cells.

Acid-type fuel cell power systems operate more efficiently and with increased power density in a pressurized environment. In a pressurized fuel cell power plant the fuel cell stack is enclosed in a containment vessel. Pressurized reactant streams i.e. fuel and oxidant are supplied to the fuel cell stack. The containment vessel is maintained in an elevated pressure to reduce the driving force for hydrogen leakage from the fuel cell stack. Typically, nitrogen is employed as the inert gas stream. The storage of nitrogen as a high pressure gas or as a cryogenic liquid is cumbersome. Alternatively, an inert exhaust gas may be provided by the combustion of a fuel in air. These conventional methods for providing an inert gas stream have proven to be costly and cumbersome.

DISCLOSURE OF INVENTION

A fuel cell power plant which employs a less complex, less costly and more reliable inert gas system is disclosed. The fuel cell power plant system comprises a contaminant vessel, a fuel cell, enclosed within the containment vessel and including an anode and a cathode, for electrochemically reacting a pressurized fuel stream and a pressurized oxidant stream to produce electricity, an anode exhaust stream and a cathode exhaust stream, a combustor for combusting a mixture of anode exhaust and cathode exhaust to produce heat and a combustor exhaust stream, means for directing a pressurized stream of combustor exhaust through the containment vessel to provide a continuous purge of the containment vessel and produce a containment vessel exhaust stream, means for maintaining a positive pressure differential between the containment vessel exhaust stream pressure and the fuel stream and oxidant stream pressures to prevent leakage of fuel and oxidant from the fuel cell.

A method of operating a fuel cell power plant is also disclosed. The method comprises a method of operating a fuel cell, comprising: electrochemically reacting a pressurized fuel stream and a pressurized oxidant stream in a fuel cell to produce electricity, an anode exhaust stream and a cathode exhaust stream, wherein said fuel cell is enclosed within a containment vessel, combusting a mixture of anode exhaust and cathode exhaust to produce heat and a combustion exhaust stream, directing a pressurized stream of combustion exhaust gas through the containment vessel to provide a continuous purge of the containment vessel and produce a containment vessel exhaust stream, maintaining a positive pressure differential between the containment vessel exhaust stream pressure and the fuel stream and oxidant stream pressures to prevent leakage of fuel and oxidant from the fuel cell.

The forgoing and other features and advantages of the present invention will become more apparent from the following description and accompanying drawings.

BRIEF DESCRIPTION OF DRAWINGS

The Figure shows a schematic representation of the fuel cell power plant system of the present invention.

BEST MODE FOR CARRYING OUT THE INVENTION

Referring to the Figure, a hydrocarbon fuel stream and steam are reacted in a reformer 2 to provide a hydrogen rich gas fuel steam. The reformer 2 is heated by a combustor 4.

The hydrogen rich gas fuel stream is directed from the reformer to the anode 6 of the fuel cell 8. A stream of air is compressed in a compressor 10 and directed to the cathode 12 of the fuel cell 8. The hydrogen rich fuel gas stream is oxidized in the fuel cell 8 to provide electricity, an anode exhaust gas stream, and a cathode exhaust gas stream. The anode exhaust gas stream is directed to the combustor 4. The cathode exhaust gas stream is directed through a heat exchanger 14 to the combustor 4. The cathode exhaust gas stream and anode exhaust gas stream are combusted in the combustor 4 to provide heat for the reformer 2 and a noncombustible combustor exhaust gas stream. The combustor exhaust stream comprises $N_2$, $H_2O$ vapor and less than 4 mole % $O_2$. The combustor exhaust gas stream is directed through the heat exchanger 14 to preheat the incoming cathode exhaust gas stream. A first portion of the combustor exhaust gas stream is directed to a turbine 16 to provide part of the energy necessary for compressing the air stream.

A second portion of the combustor exhaust gas stream is directed through a blower 18 to the fuel cell containment vessel 20 as a stream of purge gas. The interior of the containment vessel 20 is maintained at a pressure that is slightly higher than the reactant pressure within the fuel cell 8 to prevent leakage of reactants from the fuel cell 8. The inert combustor exhaust gas stream flows through the containment vessel 20 and purges the containment vessel 20 of any fuel or oxidant that might leak from the fuel cell 8. The containment vessel purge system of the present invention allows a dynamic balance to be maintained between the purge gas pressure within the containment vessel 20 and the reactant pressure within the fuel cell 8. The stream of purge gas exits the containment vessel 20 through an orifice 22 and is combined with the cathode exhaust gas stream. The purge gas pressure and the cathode exhaust pressure differ by the pressure drop across the orifice. The orifice 22 is sized so that a pressure drop between about 2 psi and about 3 psi is maintained at peak load. A differential pressure sensor 24 monitors the differential pressure across the orifice and provides a signal to an actuator 26 if the differential pressure exceeds a preselected maximum. A relief valve 28 is provided to relieve transient pressure imbalances and prevent development of an excessive pressure differential between the fuel cell stack and the containment vessel. In response to the signal, the actuator 26 opens the relief valve 28 to bypass the orifice 22.

It should be noted that an additional safety feature may be employed to limit the composition of the purge gas exiting the containment vessel. A conventional combustibility sensor (not shown) may be disposed in the flow path of the purge gas as it exits the containment vessel to monitor the composition of the purge gas. If the sensor detects combustible purge gas exiting the containment vessel, the fuel cell power plant is shut down.

The fuel cell power plant of the present invention employs a simple, cost effective and reliable containment vessel purge system. The system provides dynamic pressure balancing between the purge gas and the reactants to prevent leakage of the reactants from the fuel cell yet avoid excessive pressure differentials.

Although this invention has been shown and described with respect to detailed embodiments thereof, it will be understood by those skilled in the art that various changes in form and detail thereof may be made without departing from the spirit and scope of the claimed invention.

We claim:

1. A fuel cell power plant comprising:
   a containment vessel,
   a fuel cell, enclosed within said containment vessel and including an anode and a cathode, for electrochemically reacting a pressurized fuel stream and a pressurized oxidant stream to produce electricity, an anode exhaust stream and a cathode exhaust stream,
   a burner for combusting a mixture of anode exhaust to produce heat and a burner exhaust stream,
   means for directing a pressurized purge gas stream through said containment vessel to provide a continuous purge of said containment vessel and produce a purge gas exhaust stream,
   conduit means for directing the purge gas exhaust stream into the cathode exhaust stream, and
   means for maintaining a positive pressure differential between the purge gas stream and the fuel and oxidant streams to prevent leakage of fuel and oxidant from the fuel cell, including
   variable cross section purge gas exhaust stream flow control means interposed in said conduit means,
   means for sensing the pressure differences between said purge gas exhaust stream and said cathode exhaust stream and for providing a control signal indicative of said pressure differences, and
   means for controlling said variable cross section purge gas exhaust stream flow control means so as to vary the cross section thereof in dependence on the control signal in a sense of maintaining the positive pressure differential within a preselected range.

2. The fuel cell power plant of claim 1, wherein said variable cross section containment vessel exhaust stream flow control means includes a restriction, and valve means for bypassing said restriction, and valve means for bypassing said restriction, and wherein said controlling means includes actuator means, responsive to the control signal, for controlling said valve means.

3. A method of operating a fuel cell power plant comprising:
   electrochemically reacting a pressurized fuel cell stream and a pressurized oxidant stream in a fuel cell to produce electricity, an anode exhaust stream and a cathode exhaust stream, wherein the fuel cell is enclosed within a containment vessel,
   combusting a mixture of anode exhaust and cathode exhaust to produce heat and a combustion exhaust stream,
   directing a pressurized purge gas stream through the containment vessel to provide a continuous purge of the containment vessel and product a purge gas exhaust stream,
   directing the purge gas exhaust stream at a controllable flow rate into the cathode exhaust stream, and
   maintaining a positive pressure differential between the purge gas stream and the fuel and oxidant streams to prevent leakage of fuel and oxidant from the fuel cell, including
   sensing pressure differences between the purge gas exhaust stream and the cathode exhaust stream,
   providing a signal indicative of such sensed pressure differences, and
   controlling the flow rate of the purge gas exhaust stream into the cathode exhaust stream in dependence on the signal in a sense of maintaining the positive pressure differential within a preselected range.

4. The method of claim 3, wherein said step of directing the containment vessel exhaust stream into the cathode exhaust stream includes passing the containment vessel exhaust stream through a constant cross section restriction, and wherein said controlling step includes bypassing the restriction if the difference in pressure is above the preselected range.

* * * * *